US010676068B2

(12) United States Patent
Kuchly et al.

(10) Patent No.: US 10,676,068 B2
(45) Date of Patent: Jun. 9, 2020

(54) CAP AND DRIVING ARM FOR A WIPING DEVICE FOR A MOTOR VEHICLE

(71) Applicant: Valeo Systèmes d'Essuyage, Le Mesnil Saint Denis (FR)

(72) Inventors: Nicolas Kuchly, Talence (FR); Cyrille Girodot, Saint Babel (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 231 days.

(21) Appl. No.: 15/381,745

(22) Filed: Dec. 16, 2016

(65) Prior Publication Data

US 2017/0182979 A1    Jun. 29, 2017

(30) Foreign Application Priority Data

Dec. 23, 2015    (FR) ..................... 15 63199

(51) Int. Cl.
*B60S 1/34*    (2006.01)
*B60S 1/40*    (2006.01)
*B60S 1/38*    (2006.01)

(52) U.S. Cl.
CPC ............. *B60S 1/349* (2013.01); *B60S 1/3481* (2013.01); *B60S 1/3431* (2013.01); *B60S 2001/3898* (2013.01)

(58) Field of Classification Search
CPC ......... B60S 1/34; B60S 1/3481; B60S 1/4038
See application file for complete search history.

(56) References Cited

U.S. PATENT DOCUMENTS

| 7,996,951 B2* | 8/2011 | Waible ................. B60S 1/3452 15/250.351 |
| 7,996,952 B2* | 8/2011 | Horstman ............ B60S 1/3431 15/250.351 |
| 8,857,007 B2* | 10/2014 | Kato ....................... B60S 1/16 15/250.14 |
| 8,881,337 B2* | 11/2014 | Boland ................ B60S 1/3436 15/250.32 |
| 9,327,686 B2* | 5/2016 | Kato .................... B60S 1/3411 |
| 9,539,985 B2* | 1/2017 | Mouth ................. B60S 1/3452 |
| 9,902,372 B2* | 2/2018 | Ouchi .................. B60S 1/3481 |
| 2014/0182076 A1 | 7/2014 | Moll |
| 2015/0329084 A1 | 11/2015 | Matsuura et al. |

FOREIGN PATENT DOCUMENTS

| CN | 103144609 A | 6/2013 |
| EP | 0468850 A1 | 1/1992 |
| FR | 2543897 A1 | 10/1984 |
| FR | 2607766 A1 | 6/1988 |

OTHER PUBLICATIONS

First Office Action issued in corresponding Chinese Patent Application No. 201611273071.4, dated Oct. 31, 2018 (11 pages).

* cited by examiner

*Primary Examiner* — Michael D Jennings
(74) *Attorney, Agent, or Firm* — Osha Liang LLP

(57) ABSTRACT

The invention relates to a cap A comprising a first portion 1 that is able to cover a first end of a wiper arm of a wiping system of a vehicle, and a second portion 2 comprising an attachment means for attaching the cap A to the driving arm, characterized in that this attachment means comprises at least one rotation zone 222 that is arranged so as to allow the cap A to rotate with respect to the driving arm, and a zone 223 for locking said cap A to said driving arm.

21 Claims, 9 Drawing Sheets

CAP AND DRIVING ARM FOR A WIPING DEVICE FOR A MOTOR VEHICLE

Figure 1:
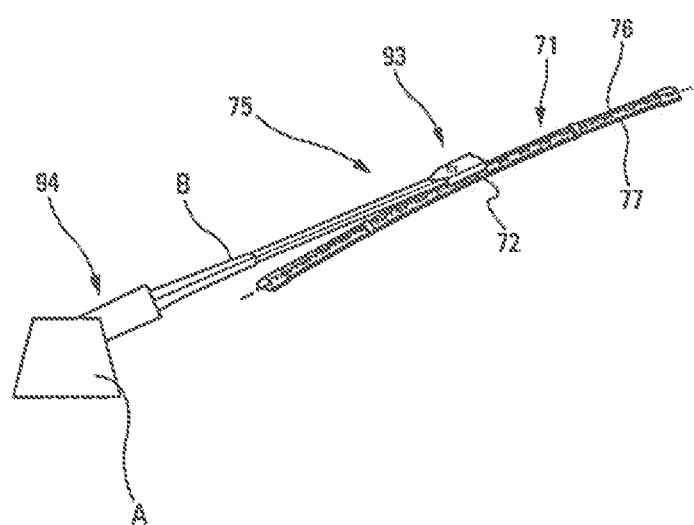

The present invention relates to the field of wiping devices for motor vehicles.

These are usually equipped with windscreen wiping systems for sweeping and cleaning essentially the front and rear glazed surfaces, and thus for avoiding the driver's view of the surroundings being impaired. These window wipers conventionally comprise at least one arm that performs an angular back-and-forth motion, to which arm is attached, at one end of the latter, and elongate wiper blade, the head bearing a squeegee blade made of an elastic material. By rubbing against the surface that is to be wiped, the squeegee blade removes water and dirt therefrom, taking them out of the field of view of the driver.

The invention relates to aspects of such a device, in which the base of the driving arm, that is to say the opposite end from that to which is attached the wiper blade, is connected in rotation to a motorized shaft of a driving motor via a driving element, the motorized shaft being essentially perpendicular to a longitudinal direction along which extends the driving arm, and to the glazed surface that is to be wiped.

For reasons of both regulations and aesthetics, it is necessary to avoid or hide any part that protrudes into the zone in which the driving arm, the motorized shaft and the drive interact in order to permit the angular back-and-forth motion of the driving arm. Indeed, in the event of an impact close to the glazed surface that is to be wiped, for example in the event of a collision with a pedestrian, any protruding part such as the end of the motorized shaft may cause additional damage or injury. To that end, it is known to use a cap whose role is to serve as protection and as a shroud for the protruding elements of the driving arm.

The manner in which such a cap is attached to the wiping system is worthy of improvement. Indeed, it is necessary to ensure a good mechanical connection between the cap and wiping system while making it possible to remove the cap in order to gain access to the motorized shaft.

These constraints make it necessary to revisit the design of the cap, the manner in which the cap is connected to the wiper arm and the steps for fitting such a cap to a driving arm.

The present invention has the object of remedying these drawbacks, and of proposing a device which is more robust while retaining its aesthetic qualities of visual continuity and continuing to perform the functions of shroud and protection for protruding elements of the assembly formed by the driving arm, the drive and the motorized shaft.

To that end, the present invention relates first of all to a cap comprising a first portion that is able to cover a first end of a wiper arm of a wiping system of a vehicle, and a second portion comprising an attachment means for attaching the cap to the driving arm, characterized in that this attachment means comprises at least one rotation zone that is arranged so as to allow the cap to rotate with respect to the driving arm, and a locking zone for locking said cap to said driving arm.

The cap according to the invention also has one or more of the following features, whether alone or in combination:
- the second portion is in the form of a tab which extends longitudinally away from a cavity delimited by the first portion,
- the rotation zone and the locking zone are delimited by an extension which extends from a lower face of the second portion,
- the rotation zone is separated from the locking zone by at least one nib, in particular in the form of a spur, this spur being predominantly raised towards the second portion, in particular towards the lower face of the tab,
- the rotation zone and the locking zone are in the form of hollows created in a blade of the second portion, in particular of the extension, and forming the latter,
- the rotation zone is created between the locking zone and a distal end of the second portion, as seen in a longitudinal axis of the cap,
- the rotation zone comprises an entrance bounded at least in part by an entrance lug, the latter blocking the cap in a certain angular position of the cap with respect to the driving arm. This entrance lug advantageously forms a free end of the extension,
- the entrance is bounded by a distal end of the second portion,
- the locking zone comprises a longitudinal rib,
- the extension comprises, on one hand, a connecting wall by which it is connected to a lower face of the tab forming the second portion of the cap, the connecting wall comprising an arm attached to the lower face and essentially perpendicular to this lower face and, moreover, a blade that extends, along a longitudinal direction of the tab, beneath the lower face of the latter, between the connecting wall and a distal end of said tab,
- the locking zone is located, along the longitudinal direction in which said second portion extends, between the rotation zone and the connecting wall by which the extension is connected to the lower face of the second portion,
- the blade comprises, at its free end, an entrance lug whose upper face faces and is essentially parallel to the lower face of the second portion,
- a platform begins against the lower end of its second portion, between the distal end of this second portion and the zone by means of which the connecting wall of the extension is connected to this lower face,
- the platform extends transversely, in particular symmetrically, on either side of the blade of the extension,
- the connecting zone between the connecting wall and the blade of the extension forms a spur which extends below the lower face of the blade,
- the first portion delimits a cavity that is open at its lower end and closed at its upper end by a wall, an upper face of the second portion extending in a plane that is essentially parallel to a plane in which extends the wall,
- the first portion comprises at least one side wall which delimits at least the cavity and which extends from the lower end of the cavity to the wall, and in which a cutout is arranged in the side wall of this cavity. This cutout is designed to allow the wiper arm to enter the cavity. Each of the edges of the cutout extends from the zone by which a side wall of the second portion of this cap is connected to the first portion, and up to a lower edge of said cavity, such that the cutout is located opposite the extension borne by the second portion of the cap,
- the first portion is symmetric along the same longitudinal axis as that along which the second portion of said cap extends,
- at least one immobilizing means, in particular in the form of an immobilizing lug, is arranged in the lower part of an internal surface of at least one side wall delimiting the cavity, the immobilizing means being designed to lock the cap on a driving arm, according to one embodiment, the rotation zone is defined by the concave portion of a rotation hook which extends from the lower face of the tab, and the locking zone is defined by the concave portion of a locking hook, the concave character of the rotation hook being apparent when seen from the first portion of the cap, while the concave character of the locking hook is apparent when seen from the distal end of the second portion of the cap, the locking hook thus being placed between the rotation hook and the first portion of the cap.

According to various advantageous embodiment of the invention, the first portion of the cap is essentially cylindrical, frustoconical, or in any other shape insofar as it is symmetric with respect to a median longitudinal plane which includes the longitudinal axis along which the second portion of said cap extends.

The invention also relates to a driving arm, in particular a wiper arm that is able to engage with a cap as described above.

Thus, the invention also relates to a wiper arm for a wiping system of a vehicle, in particular a motor vehicle, comprising a front end that is able to receive a wiper blade, a rear end that is able to be connected to a motorized shaft via the intermediary of a drive, and a body located between these two ends, characterized in that it comprises, at its rear end, an arch in which is arranged an opening for receiving the motorized shaft, and in that it comprises, between this arch and its body, at least one receiving pocket and one locking pocket that are able to engage with a cap that covers the arch.

The wiper arm according to the invention also has one or more of the following features, whether alone or in combination:

the locking pocket is placed, along a longitudinal axis in which extends the driving arm, between the receiving pocket and the accommodating opening, the receiving pocket and the locking pocket extend longitudinally and transversely in a force-transfer zone, being for example symmetric with respect to a longitudinal axis of the driving arm, a transverse dimension of the receiving pocket is greater than a transverse dimension of the locking pocket, measured along two parallel straight lines, the receiving pocket and the locking pocket are separated from one another by an engagement bar, the engagement bar is of cylindrical cross section, in particular of circular cross-section, and may for example comprise a flat which is, in particular, arranged essentially at the centre along the transverse direction of the engagement bar, the flat 530 forms an angle of between 30 and 45 degrees with the vertical direction, the wiper arm has a clear area delimited at least by two side walls and, in complementary fashion, by a bottom of the clear area, and set back from an upper surface of the body of the driving arm, at least one of the side walls being level, for example aligned, with said upper surface of the body of the driving arm, a transverse dimension of the locking pocket is less than a transverse dimension separating the two side walls, as measured along one and the same straight line, a front wall of the clear area, located closest to the body of the driving arm, constitutes a front wall of the receiving pocket, the aide walls of the clear area constitute the side walls of the receiving pocket and extend, in the direction of the arch, along the locking pocket, up to a zone located between a rear wall of the locking pocket and a front wall of the accommodating opening, and upper face of a rear wall of the wiper arm is substantially raised, and additionally or alternatively inclined, with respect to an upper face of the body of the driving arm, a rear face of the rear wall is substantially inclined, such that its lower edge is further from the accommodating opening than its upper edge, along the longitudinal axis of the driving arm, the material which constitutes the wiper arm is thicker at its arch than at its body.

Finally, the invention relates to a wiping assembly for a vehicle, in particular a motor vehicle, characterized in that it comprises a wiper arm and a cap, these being as described in the present document. Such a wiping assembly is more particularly suitable for being installed at the rear of a motor vehicle, in particular against a rear window of said vehicle In such an assembly, the rotation zone extends in the receiving pocket, while the locking zone extends in the locking pocket, an engagement bar of the wiper arm being received in the locking zone.

According to one embodiment, a longitudinal rib of the cap, which forms part of the locking zone, extends in a notch created in the engagement bar.

Finally, the invention relates to a method for fitting a cap to a driving arm, comprising at least the following steps, which are for example carried out in succession:

a. engaging a second portion of the cap in a receiving pocket of the wiper arm such that an upper face of an entrance lug of the cap is engaged against a flat of an engagement bar of the driving arm, b. translating the cap along a longitudinal axis of the second portion until the engagement bar is inserted into a rotation zone of extension of the cap, c. rotating the cap about the engagement bar until an upper face of the second portion of the cap is brought into a position that is essentially parallel to an upper face of a body of the driving arm. Optionally, in this rotational movement, the edges of a cutout of the cap are positioned on either side of side walls of the wiper arm such that the first portion of the cap comes to fit over the arch of the driving arm, the second portion of the cap becoming engaged in the clear area. Advantageously, the shape and dimensions of the second portion and of the clear area match, d. locking the cap to the wiper arm by a translation towards a front end of the wiper arm until the engagement bar passes a leg separating the rotation zone from a locking zone, and is received in a locking zone of the cap. Optionally, the lower face of the second portion of the cap then rests on a base that delimits the clear area arranged in the driving arm, closing off, for example entirely, the receiving and locking pockets, the distal end of the second portion of the cap coming to abut against a front wall, of the clear area, arranged in the driving arm, a base of the extension of the cap being in contact with the engagement bar of the wiper arm on either side of the flat, with side walls or side segments of the second portion of the cap coming to abut against the side walls of the clear area of the driving arm. The immobilizing means arranged in the cap is then positioned below a lower edge of the driving arm.

Figure 2:
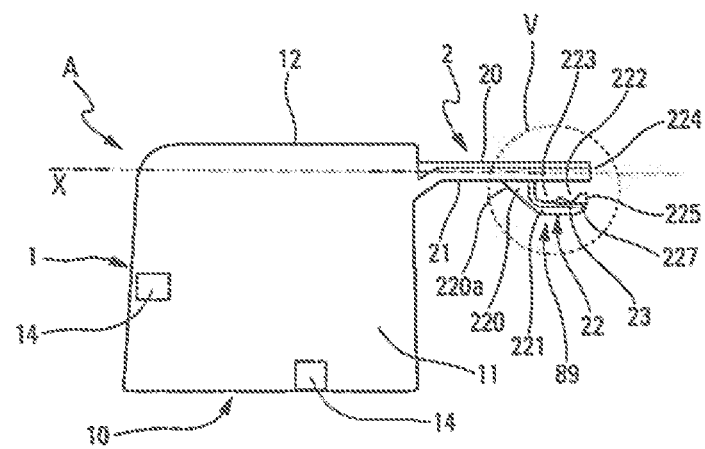
Figure 3:
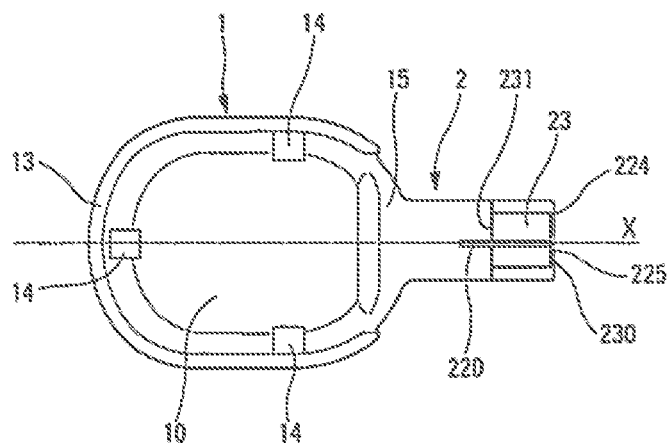
Figure 4:
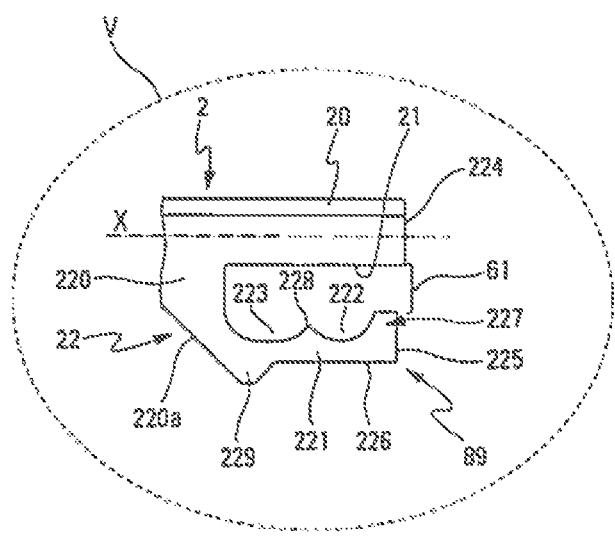
Figure 5:
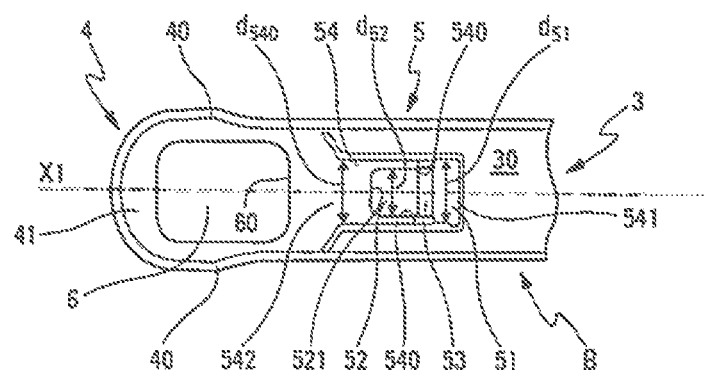
Figure 6:
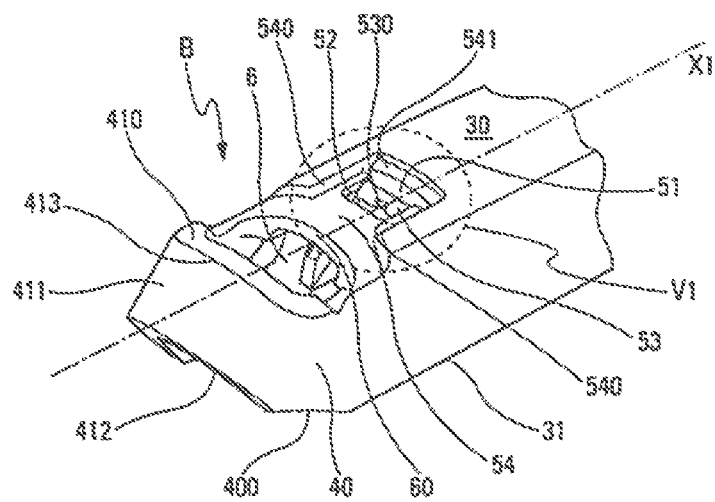
Figure 7:
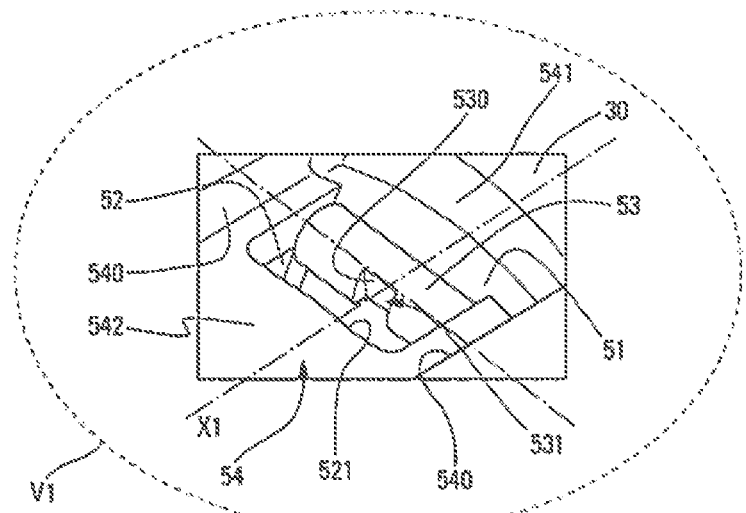
Figure 8:
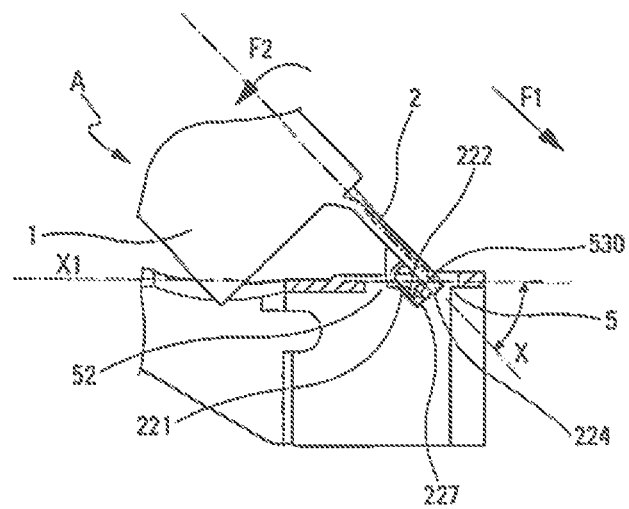
Figure 9:
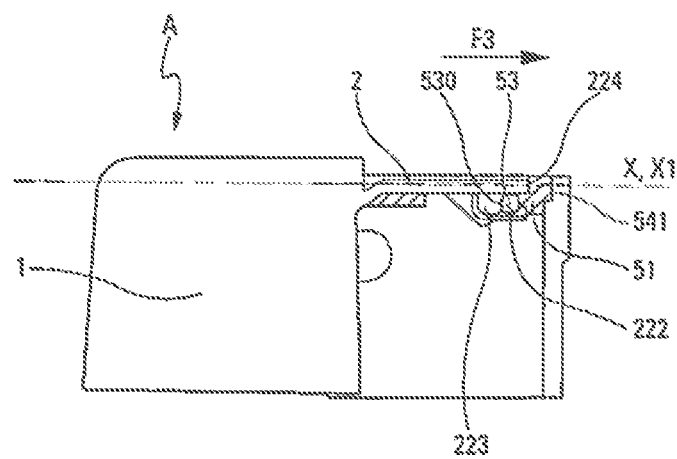
Figure 10:
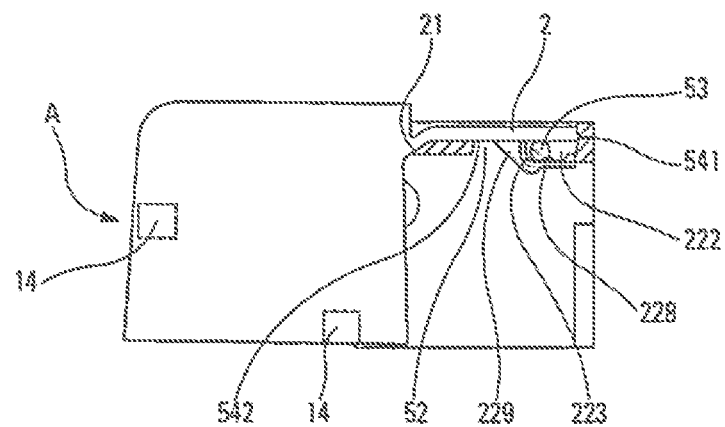
Figure 11:
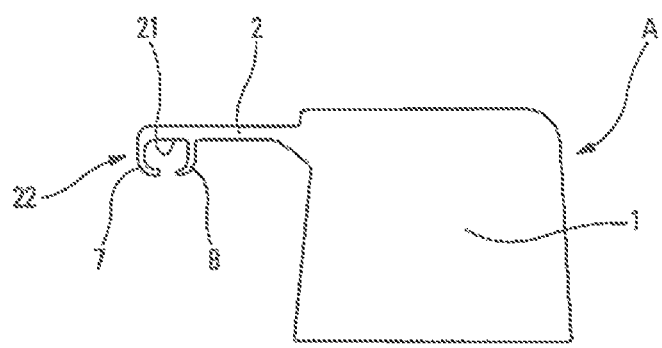
Figure 12:
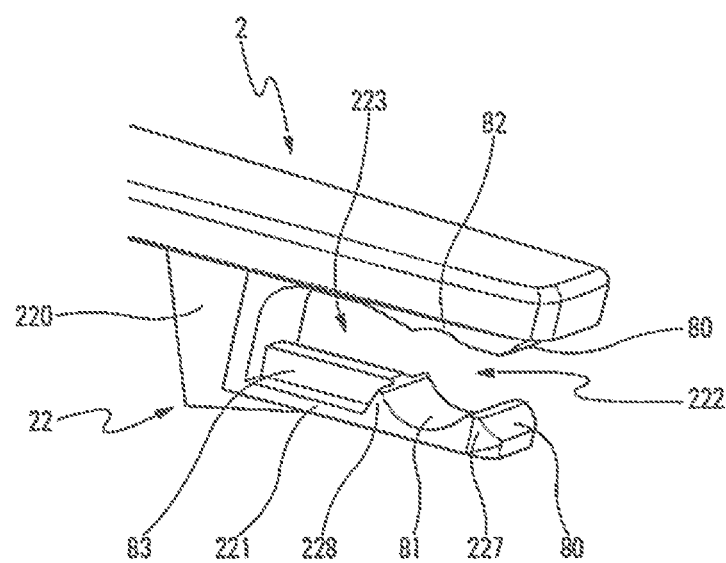
Figure 13:
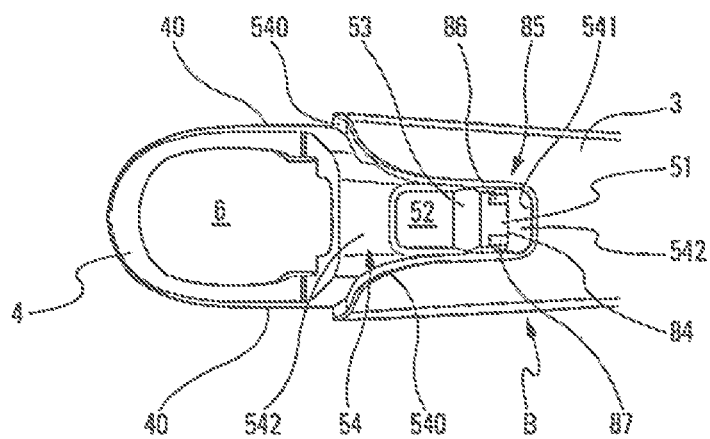
Figure 14:
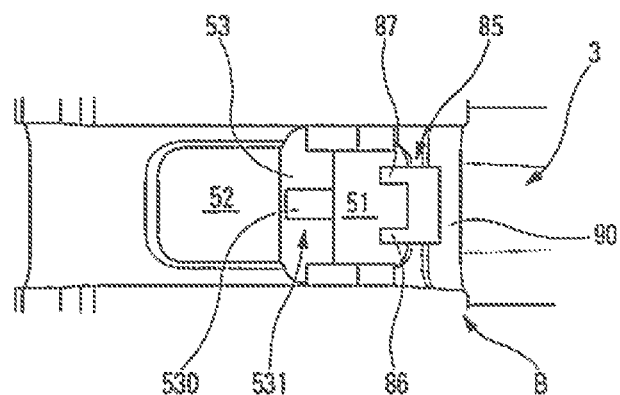
Figure 15:
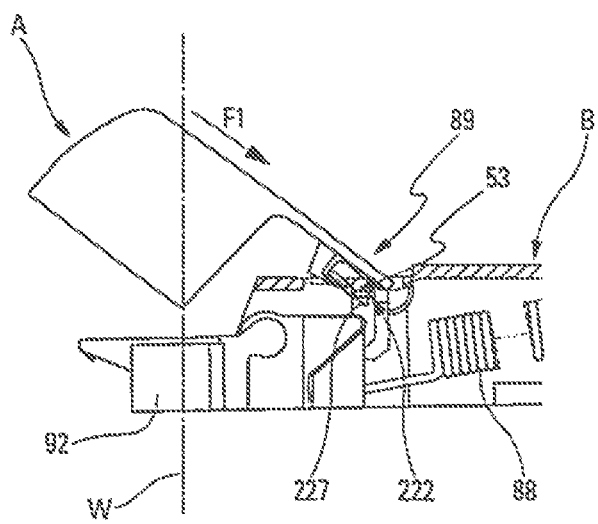
Figure 16:
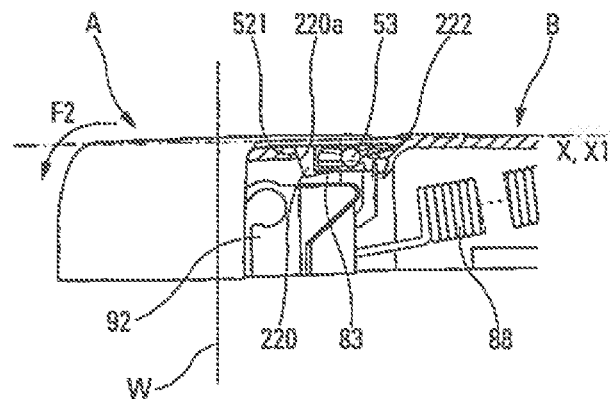
Figure 17:
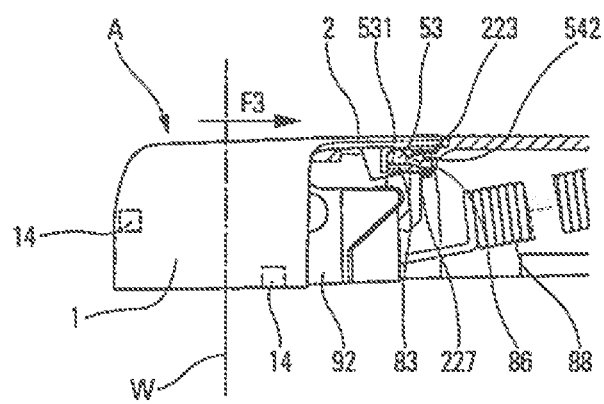

Other features, details and advantages of the invention will become clearer upon reading the description, provided below by way of indication, in conjunction with the following drawings, in which:

FIG. 1 is a perspective view of a wiping system according to the invention,

FIG. 2 is a side view of a cap according to a first embodiment of the invention, FIG. 3 is a view from below of a cap according to the invention, FIG. 4 is a side view of a detail V of a cap according to the invention, shown in FIG. 2, FIG. 5 is a top view of part of a wiper arm according to a first embodiment of the invention, FIG. 6 is a perspective view of part of a wiper arm according to the invention, FIG. 7 is a perspective view of a detail VII of a wiper arm according to the invention, as shown in FIG. 6, FIG. 8 is a side view showing a first step of assembling a cap and a driving arm, shown in section, according to one embodiment of the invention, FIG. 9 is a side view of a cap and of a driving arm, shown in section, according to one embodiment of the invention, in an engaged but not locked position of said cap with said driving arm, FIG. 10 is a side view of a cap and of a driving arm, shown in section, according to one embodiment of the invention, in their assembled and locked position, FIG. 11 is a side view of a variant embodiment of a cap according to the invention, FIG. 12 is a perspective view of the second portion of the cap, according to a second embodiment, FIG. 13 is a perspective view showing the top of part of a wiper arm according to the second embodiment of the invention, FIG. 14 is a perspective view showing the underside of part of the wiper arm according to the second embodiment of the invention, FIGS. 15 to 17 show steps of fitting the cap onto a driving arm, according to the second embodiment of the invention.

It is to be noted first of all that, if the figures provide a detailed disclosure of the invention for its implementation, these figures may of course serve to better define the invention, as the case may be.

In the rest of the description, the labels longitudinal or transverse, top, bottom, lower, upper, front and rear referred to the orientation of the wiper arm of a wiping device of a motor vehicle once this wiping device is installed on this vehicle. The longitudinal direction corresponds to that of the principal axis of the driving arm, along its principal extent, and the labels front and rear, according to this direction, refer respectively to that end of the wiper arm to which the wiper blade is attached, and to the opposite end of this arm, at which it is attached to its device for driving in rotation. The transverse orientations correspond to straight lines which intersect the longitudinal direction, in particular perpendicular to the longitudinal axis of the wiper arm in its plane of rotation. The directions referred to as upper or lower correspond to orientations perpendicular to the plane of rotation of the wiper arm and parallel to the axis of rotation thereof, the label lower containing the plane of the surface that is to be wiped.

In FIG. 1, a motor vehicle is frequently equipped with a wiping system 75 for removing water and/or dirt from a glazed surface of the motor vehicle. The wiping system 75 comprises a wiper arm B which is able to effect an angular back-and-forth motion along and over the glazed surface. The glazed surface may equally be a front windscreen or a rear window fitted to the motor vehicle. In the remainder of the description, the rear window will serve as an exemplary application of the glazed surface.

The wiper blade 71 is equipped with a connection device 72 that establishes a mechanical connection between a first end 93 of the wiper arm B and the wiper blade 71, and thus makes it possible to separate the wiper blade 71 from the wiper arm B, in order to replace the wiper blade 71.

The wiper blade 71 may comprise at least one air deflector 76 and a squeegee blade 77. The air deflector 76 is designed to convert pressure applied by a flow of air over the glazed surface into a contact force of the wiper blade 71 against the windscreen of the motor vehicle. The squeegee blade 77 is the part of the wiper blade 71 that is in direct contact with the glazed surface in order to remove water and/or dirt present thereon. The air deflector 76 and the squeegee blade 77 form a semi-rigid assembly 78 which is borne by the connection device 72.

This wiping system 75 is made to rotate by a motor that is secured to the body of the vehicle. This motor comprises a motorized shaft which is controlled directly or indirectly by the motor. This motorized shaft passes through the body or the glazed surface, and the part protruding from this glazed surface serves as an attachment point for the wiper arm B. Such an attachment may be effected using a nut which clamps a second end 94 of the wiper arm B against the motorized shaft. According to the invention, this attachment is covered by a cap A, the design of which will be presented hereinbelow.

FIGS. 2 to 4 illustrate a first embodiment of a cap A according to the invention. With reference to these figures, the cap A according to the invention comprises a first portion 1, also called the body. In the following, the label "body" will be used equally to designate the first portion 1 of the cap A according to the invention. This body comprises a cavity 10 that is delimited by at least one thin side wall 11, is open at one of its ends and is closed at its opposite end by an upper wall 12. Advantageously, a contact surface 13 formed by the section of the side wall 11 at the open end of the body 1 is essentially parallel to the upper wall 12 of this body 1. According to a non-exclusive embodiment of the invention, the body 1 of the cap may be slightly widened towards its open end. In other words, the outer perimeter of the side wall 11 is higher at the contact surface 13 than it is at the upper wall 12. According to the first embodiment of the invention shown in FIGS. 2 to 11, the side wall 11 which delimits the cavity 10, when seen in section in a plane essentially parallel to its contact surface 13 or to its upper wall 12, is in the shape of a rectangle having rounded corners. In other alternative embodiments, the side wall 11 may be in other shapes which may include but are not limited to a portion of the cylinder or of a frustum in which the diameter at the level of the upper wall 12 is smaller than the diameter at the level of the contact surface 13.

According to the invention, at least one immobilizing lug 14 is arranged in or extends into the cavity 10 on an internal face of the side wall 11 which delimits this cavity, close to the lower end of the latter. The role of this lug will be set out later on. According to the embodiment shown in FIGS. 2 to 4, a single immobilizing lug 14 is arranged on the internal face of the side wall 11. According to other alternative embodiments, multiple immobilizing lugs 14, for example grouped into opposing pairs, may be arranged on the internal face of this same wall.

According to the invention, the cap A also comprises a second portion 2 which extends longitudinally from an outer face of the side wall 11 of the first portion 1 of this same cap, close to the upper wall 12 of this first portion, and opposite the cavity 10 delimited by the side wall 11 of this same first portion. Advantageously, and as shown in the figures, this second portion 2 is in the form of a straight tab which is made in one piece with the first portion 1 and which extends away from the cavity 10, essentially parallel to the upper wall 12 of this cavity. In the following, the label "tab" will equally be used to designate this second portion 2 of the cap A according to the invention. According to the first embodiment of the invention shown in FIGS. 2 to 11, this tab 2 bears an attachment means 89 by means of which the cap A can be mechanically connected to the wiper arm and can be secured to this arm.

The tab 2 comprises an upper face 20 that is essentially parallel to the upper wall 12 of the body of the cap A. While it is parallel or essentially parallel to the upper wall 12 of the body 1, the upper face 20 of the tab 2 extends along a plane that is different to the plane that includes the upper wall 12 of the body 1, in particular in that it is offset towards the contact surface 13. Alternatively, the upper face 20 of the tab 2 may be in a plane in common with the plane that includes the upper wall 12 of the body 1.

Advantageously, the tab 2, at a zone where it attaches to the body 1, is slightly widened so as to strengthen the cap A according to the invention. In order to allow the cap A to be installed on a wiper arm B of a wiping device, the side wall 11 of the body 1 of the cap A has a cutout 15 which extends, in the vertical direction as defined above, from the attachment zone between the tab 2 and the body 1 to the lower edge of said body 1, that is to say to the contact surface 13. Advantageously, the transverse dimension of the cutout 15 is greater than that of the tab 2, as measured along the same transverse direction, as shown more precisely in FIG. 3.

According to the embodiment of the invention that is more particularly shown in FIGS. 2 to 4, the general shape of the tab 2 is essentially rectangular, as seen from above, and it extends, as shown in FIG. 3, essentially along the direction of a longitudinal axis X of the cap A, which longitudinal axis X also forms, for this tab, a longitudinal axis of symmetry. According to the embodiment of the invention more particularly shown in FIG. 3, an immobilizing lug 14 as previously defined is arranged essentially on the longitudinal axis X, longitudinally in line with the tab 2, which it faces, at the mid-height of the internal face of the side wall 11 opposite said tab 2. Two other immobilizing lugs 14 they also be arranged on the internal face of the side wall 11, opposite one another and in a direction perpendicular to a longitudinal median plane passing through the longitudinal axis X of the cap A. These two immobilizing lugs 14 are arranged in the immediate vicinity of the contact surface 13 of the cap A.

According to the invention, the tab 2 comprises, proceeding from its lower face 21 that is opposite its upper face 20, an extension 22 which will now be described in detail, this extension 22, in combination with the lower face 21 of the tab 2, forming an exemplary embodiment of the attachment means 89.

According to the invention, the extension 22, which is advantageously made in one piece with the tab 2 of the cap A, extends essentially in a central transverse position from the lower face 21 of the tab 2, as shown more particularly in FIG. 3. Thus, this extension 22 extends essentially along the longitudinal axis X defined previously.

The extension 22 is attached to the lower face 21 of the tab 2 by a connecting wall 220 that is advantageously placed, along the direction of the longitudinal axis X, between a proximal end by means of which the tab 2 is connected to the first portion 1 of the cap, and a distal end 224 of this tab 2, which is opposite the proximal end. Advantageously, the connecting wall 220 extends, from the lower face 21 of the tab 2, essentially perpendicular thereto. With reference to the orientations defined previously, this wall 220 therefore extends essentially vertically, in the direction of the lower portion of the cap A, that is to say in the direction of the open end of the body 1 of this cap. The connecting wall comprises a rear edge, with the reference sign 220a, the function of which will be set out later on.

According to the invention, the extension 22 of the tab 2 then continues in the form of a blade 221, advantageously of the same transverse thickness as the connecting wall 220. According to the first embodiment of the invention shown in FIGS. 2 to 11, the blade 221 is very slightly shorter, in the direction of the longitudinal axis X, than that part of the tab 2 below the lower face 21 of which it extends.

According to one advantageous feature of the invention, a rotation zone 222 and a locking zone 223 are delimited by the extension 22. According to the embodiment of the invention shown in FIGS. 2 to 4, the rotation zone 222 is in the form of a hollow arranged in an upper portion of the blade 221, that is to say that portion of this blade which is oriented toward the lower face 21 of the tab 2. Advantageously, the rotation zone 222 is arranged close to the free end of the blade 221, that is to say that it is close to the distal end 224 of the tab 2 of the cap A. The distal end 224 of the tab 2 is formed by the free end of the tab 2 in the longitudinal axis of the latter.

More precisely, the rotation zone 222 is arranged in the upper portion of the blade 221 such that a portion of this upper wall, which is essentially planar and parallel to the lower face 21 of the tab 2 of the cap A, remains, between a distal end 225 of the blade 221 and the rotation zone 222. In other words, the rotation zone 222 is separated from the free end of the blade 221 by a portion of this blade, which thus the limits, with the distal end 225 and the lower face 226 of the latter, and entrance lug 227, the function of which will be set out later on.

These figures show that the rotation zone 222 comprises an entrance 61 via which an engagement bar of the wiper arm is able to enter. This interaction will be explained in detail later on. This entrance 61 is bounded at least in part by the entrance lug 227. In the embodiment shown here, the entrance 61 is also bounded by the distal end 224 of the second portion 2, in particular in the form of the tab 2.

According to the embodiment of the invention shown in FIGS. 2 to 4, the locking zone 223 is also in the form of a hollow arranged in the upper portion of the blade 221, between the rotation zone 222 and the connecting wall 220 between the extension 22 and the lower face 21 of the tab 2 of the cap A, that is to say also between the rotation zone 222 and the body 1 of the cap A, Advantageously, the rotation zone 222 and the locking zone 223 are separated from one another by a nib 228, forming an immobilizing indentation.

Advantageously, the wall 220 connecting the extension 22 to the lower face 21 of the tab 2 comprises an inclined rear edge 220a which essentially faces the cutout 15 arranged in the side wall 11 of the body 1, the distance between these two increasing from the zone at which the wall 220 is connected to the tab 2 of the cap A according to the invention, as far as a lower face 226 of the blade 221 of the extension 22. According to the embodiment of the invention shown in FIGS. 2 to 4, the connecting zone of the inclined edge 220a and of the lower face 226 of the blade 221 forms a spur 229 which extends essentially below the lower face 226 of the blade 221, and of which the function will be set out later on.

According to another advantageous feature of the invention, the tab 2 of the cap A comprises, at its lower face 21, a platform 23, which is shown in FIG. 3. Advantageously, the platform 23 extends essentially from the distal end 224 of the tab 2 to the zone where the connecting wall 220 of the extension 22 joins the lower face 21 of the tab 2. The platform 23 extends for example symmetrically with respect to a plane passing through the longitudinal axis X and perpendicular to the tab 2, as shown in FIG. 3. In other words, and with reference to the previously defined orientations, the blade 221 and the extension 22 extend essentially below the platform 23 of the tab 2 of the cap A according to the invention. According to the embodiment of the invention shown in FIGS. 2 to 4, the platform 23 is essentially in the shape of a rectangle whose long side extends in the direction of the longitudinal axis X of the tab 2, and its end walls, as defined by this longitudinal direction and respectively referenced 230 and 231, are the short sides of said rectangle.

As has just been described, the cap A according to the invention therefore consists of a first portion, or body 1, which defines a cavity 10, and a second portion, or tab 2, of which an extension 22 forms, with said tab 2, a hook which, as will be set out later on, permits cooperation between the cap A and a wiper arm B which will now be described with reference to FIGS. 5 to 7.

Advantageously in one integral part, the wiper arm B extends longitudinally in the direction of an axis X1 shown in FIG. 5. At one of its ends (which are not shown in the figures), called the front end, it comprises means for connecting to a wiper blade. At its opposite, or rear, end, which is more particularly shown in FIGS. 5 and 7, it comprises at least one means for connecting to a drive and at least one device for connecting to a cap A according to the invention, as described above and illustrated in FIGS. 2 to 4. Between these two ends there extends a body 3 of the wiper arm B. According to the invention, the wiper arm B comprises, at its rear end, an arch 4 and a force-transfer zone 5.

The arch 4 consists of two side walls 40 and a rear wall 41 of the wiper arm B, and of a wall 60 of the force-transfer zone 5, which together delimit an accommodating opening 6. Advantageously, and as shown more precisely in FIG. 6, an upper face 410 of the rear wall 41 of the wiper arm B is substantially raised with respect to an upper face of the force-transfer zone 5 and with respect to an upper face 30 of the body 3 of the wiper arm B. The upper face 410 of the rear wall 41 of the wiper arm B is, moreover, slightly inclined towards the force-transfer zone 5. At the same time, a rear face 411 of this same, rear wall 41 is also markedly inclined such that its lower edge 412 is further away, along the longitudinal direction X1 of the wiper arm B, from the accommodating opening 6 than its upper edge 413. It follows that the side walls 40 of the arch 4, which also forms the junction between this arch 4 and the force transfer zone 5, have upper edges that are markedly inclined towards the force-transfer zone 5. Advantageously, and as shown also in FIG. 6, lower edges 400 of the side walls 40 of this arch 4 are also inclined so as to join the lower edge 412 of the rear wall 41 and a lower edge 31 of the body 3 of the wiper arm B. At this point, it should be noted, as shown in the figures, that each side wall 40 of the arch 4 forms a single continuous wall with the corresponding side walls, respectively of the force-transfer zone 5 and of the body 3 of the wiper arm B.

According to one feature of the invention, the force-transfer zone 5 comprises a first pocket 51, also called receiving pocket, and a second pocket 52, otherwise called locking pocket. Each one of these pockets extends longitudinally and transversely in the force-transfer zone 5, being symmetric with respect to a median longitudinal plane passing through the longitudinal axis X1 of the wiper arm B. According to the invention, the locking pocket 52 is placed between the receiving pocket 51 and the accommodating opening 6, as defined by the longitudinal axis X1 of the wiper arm B. Advantageously, a transverse dimension $d_{51}$ of the receiving pocket 51 is greater than that of the locking pocket 52, with the reference $d_{52}$, and it is also greater than a transverse dimension of the platform 23 arranged at the lower face 21 of the tab 2 of the cap A. According to the first embodiment of the invention, shown in FIGS. 2 to 11, the receiving pocket 51 and the locking pocket 52 are continuous, that is to say that they form through-holes in the wiper arm B. Alternatively, these pockets could consist of closed cavities or blind holes created by deformation of the wall of the driving arm.

According to another feature of the invention, the wiper arm B comprises an engagement bar 53. The receiving pocket 51 and the locking pocket 52 are separated from one another, along the longitudinal axis X1 of the wiper arm B, by the engagement bar 53, shown in detail in FIG. 7.

As shown in this FIG. 7, the engagement bar 53, which is advantageously integral with the wiper arm B, is essentially in the shape of a cylinder, for example a solid cylinder. According to the invention, an axis of the engagement bar 53 extends in a transverse direction, essentially perpendicular to that of the longitudinal axis X1 of the wiper arm B.

It should be noted that the engagement bar 53 comprises a flat 530. More precisely, according to the first element of the invention illustrated in FIGS. 2 to 11, the flat 530 consists of the bottom of a notch 531 arranged radially in the cylinder that constitutes the engagement bar 53. According to this embodiment, the notch 531 is advantageously obtained by radial movement of an essentially parallelepipedal volume in the cylinder formed by the bar 53, starting from a generatrix of the latter. According to the invention, the notch 531 is arranged essentially at the centre of the engagement bar 53, as seen in the transverse direction. Thus, this notch 531 is essentially bisected by the longitudinal axis X1 of the driving arm, the engagement bar 53 therefore being symmetric with respect to this longitudinal axis. Alternatively or additionally, the notch 531 may be offset laterally on one side or the other of a median longitudinal plane passing through the longitudinal axis X1 of the wiper arm B.

Advantageously, the notch 531 is arranged such that the flat 530 that constitutes its base forms, with the vertical direction defined previously, an angle of between 5 and 75 degrees. According to the non-exclusive embodiment of the invention, more particularly illustrated in the figures, this angle is between 30 and 45 degrees. This angle defines the inclination at which it is necessary to position the cap in order to fit it onto the engagement bar 53.

According to another feature of the invention, the upper surface of the wiper arm B comprises, at the force-transfer zone 5, an inward clear area 54. In other words, the upper surface of the force-transfer zone 5 is located slightly below the upper surface 30 of the body 3 of the wiper arm B, along the vertical direction defined previously. Advantageously, the shape and depth of this clear area 54 match the shape and thickness of the tab 2 of the cap A. More precisely, the clear area 54 is bounded longitudinally by at least two side walls 540 and by a front wall 541, which are all advantageously bevelled, and a bottom 542 of this clear area forms the upper surface of the force-transfer zone 5.

According to one advantageous feature of the invention in its first embodiment shown in FIGS. 2 to 11, the front wall 541 of the open area 54, that is to say that wall of this clear area that is closest to the body 3 of the wiper arm B, also constitutes the front wall of the receiving pocket 51, that is to say that wall of this receiving pocket that is closest to the body 3 of the wiper arm B. Furthermore, the side walls 540 of the open area 54 advantageously constitute the side walls of the receiving pocket 51. Also advantageously, these side walls 540 then extend, in the direction of the arch 4, along the locking pocket 52 as far as a zone located between a rear wall 521 of the locking pocket 52 and the front wall 60 of the accommodating opening 6. According to another feature of the invention in its embodiment shown in FIGS. 5 to 7, the transverse dimension of the bottom 542 of the force-transfer zone 5, which is referenced $d_{540}$ and measured between the side walls 540, perpendicular to the longitudinal axis X1 of the wiper arm B, is greater than the transverse dimension $d_{52}$, in the same direction, of the locking pocket 52. Also advantageously, the longitudinal axis X1 is also contained in a plane of longitudinal symmetry for the bottom 542 of the force-transfer zone 5 between the side walls 540 of the open area 54.

FIGS. 8 to 10 show a cap A according to the embodiment of the invention described previously and illustrated in FIGS. 2 to 4 being fitted onto a wiper arm B according to the embodiment of the invention just described and illustrated in FIGS. 5 to 7. It should be noted that, in FIG. 8, the cap A is shown schematically in perspective while the wiper arm B is shown in section along a vertical plane containing the longitudinal axis X1 of this arm.

With reference to this figure, the distal end 224 of the tab 2 of the cap A is first engaged in the receiving pocket 51 such that an upper portion of the entrance lug 227, for example an essentially planar portion, engages against the flat 530 arranged in the engagement bar 53. To that end, and taking into account the angle that the flat 530 forms with the vertical direction, the cap A must be presented inclined. Advantageously, and as shown in FIG. 8, the engagement bar 53 is then held between the lower face 21 of the tab 2 of the cap A and the upper portion of the entrance lug 227 of the extension 22.

In matching fashion, the engagement bar 53, on either side of the notch 531, is held between the platform 23 and the lower face 21 of the tab 2 of the cap A, that is to say within the hook formed by the extension 22 and by the tab 2 of the cap A.

Exerting a slight push in the direction shown by the arrow F1 in FIG. 8, that is to say in a direction parallel to the longitudinal axis X of the cap, is then sufficient to cause, on one hand, the upper portion of the entrance lug 227 to slide along the flat 530 and, on the other hand, the platform 23 to slide against a generatrix of the engagement bar 53 opposite the flat 530, until this engagement bar 53 is held in the rotation zone 222 of the extension 22. The flat 530 and platform 23 thus constitute means for guiding the engagement of the cap A with the wiper arm B.

Installation of the cap A is continued by imposing a rotation in the direction shown by the arrow F2 in FIG. 8, until the upper face of the tab 2 is parallel to the upper face 30 of the body 3 of the wiper arm B. More precisely, this rotation is effected about an axis consisting of the axis of the engagement bar 53. The presence of the platform 23 protruding from the lower face 21 of the tab 2 permits this positioning, the platform being located against the engagement bar 53, transversely on either side of the flat 530, and thus allowing a snug fit of the lower face 21 of the tab 2 on this bar. Advantageously, the dimensions of the tab 2 and of the body 1 of the cap A are defined such that, in this rotation movement, the edges of the cutout 15 of the body 1 of the cap A come to be positioned on either side of the side walls of the wiper arm B, the body 1 of the cap A thus coming to cover the arch 4 and to fit onto the zone where this arch joins the force-transfer zone 5 of this driving arm.

The shapes and dimensions of the clear area 54 arranged on the wiper arm B, together with the configuration of the lower face 21 of the tab 2, mean that once this tab 2 is brought parallel to the upper face 30 of the body 3 of the wiper arm B, the upper face 20 of this tab 2 is flush with the upper surface 30 of the body of the driving arm. Such a configuration makes it possible to maintain acceptable visual qualities once the cap has been fitted onto the arm.

In this engagement position, and as shown more precisely in FIG. 9, the distal end 224 of the tab 2 of the cap A is located in the receiving pocket 51, at a distance from the front wall 541 delimiting the latter, and the spur 229 of the extension 22 extends into the locking pocket 52 of the wiper arm B.

The cap A is locked to the wiper arm B by translation of the cap towards the wiper arm B, in a direction embodied by the arrow F3 in FIG. 9. In such a situation, the longitudinal axis X of the cap coincides with the longitudinal axis X1 of the driving arm.

In this translation movement, the shapes and dimensions with which this cap is provided according to the invention mean that the engagement bar 53 passes the nib 228 separating the rotation zone 222 from the locking zone 223, and is then received in the locking zone 223. The shapes and dimensions of the tab 2 are such that, in the locked position which is more particularly illustrated in FIG. 10, the distal end of this tab 2 is in abutment against the front wall 541 of the receiving pocket 51. Also, the shape and dimensions of the clear area 54 that is configured in the upper part of the wiper arm B are such that, in this locked position, the lower face 21 of the tab 2 rests against the bottom 542 of the clear area 54. Optionally, side walls of the tab 2 abut over their entire length against the side walls 540 of this same clear area 54.

At the same time as this final translational movement, the immobilizing lug 14 arranged in the lower part of the inner face of the side wall of the body 1 of the cap A advantageously fits underneath the lower edge of the rear wall of the arch or, more generally, depending on the embodiment chosen, underneath a lower edge of the wiper arm B, thus establishing a means for immobilizing the cap A with this driving arm, at least in the vertical direction.

The cap A is thus locked to the wiper arm B at least:
by the engagement of the bar 53 of the wiper arm B in the locking zone 223 of the cap A, and/or
by the cooperation of the side walls of the tab 2 of the cap A with the side walls 540 of the clear area 54 arranged in the wiper arm B, and/or
by the cooperation of the immobilizing lug 14 arranged in the cap A with a lower edge 412 of the wiper arm B.

In this position, the upper surface 20 of the tab 2 of the cap A is, as shown in the figures, visually continuous with the upper surface of the wiper arms, and it should be noted that the tab 2 of the cap A entirely closes off both the receiving pocket 51 and the locking pocket 52.

Furthermore, the body 1 of the cap A is, in this locked position, fitted over the arch 4 of the wiper arm which receives the motorized shaft about which this arm is driven in rotation, as well as the driving element and all of the elements necessary for implementing this rotation.

The wiper arm B according to the invention, as described and illustrated by the figures, comprises no discontinuity which might give rise to a mechanical weakness when a high torque is applied to the wiper arm in the context of the angular back-and-forth motion. Indeed, the clear area 54 arranged in the upper part of the wiper arm B is shallow. Moreover, one advantageous feature is that the invention provides that the material thickness forming the wiper arm is, at the level of the arch 4 and of the force-transfer zone 5, greater than the material thickness forming the body 3 of this driving arm. Furthermore, the material that constitutes the cap A is advantageously selected both for its mechanical strength and deformation properties. Thus, materials such as the polymers known by the acronyms POM and PBT may, by way of nonlimiting example, be used. Moreover, the presence of the spur 229 on the extension 22 of the cap A constitutes a reinforcing zone for this part during deformation in order to allow insertion of the engagement bar 53 of the wiper arm B first into the rotation zone 222 and then into the locking zone 223 of the cap A. Thus, the invention achieves one of its stated aims, by proposing a robust assembly.

Uncoupling the cap A and the wiper arm B involves merely reversing the order of the assembly procedure.

FIG. 11 shows an alternative embodiment of a cap A according to the invention, in which the extension 22 of this cap is replaced by a rotation hook and a locking hook, respectively referenced 7 and 8, which each delimit, together with the lower face 21 of the tab 2 of this cap A, respectively the rotation zone 222 and the locking zone 223, the other elements of the cap A being as described previously and illustrated in the preceding figures.

According to this embodiment, the two hooks 7 and 8 are concave and their concavities face one another. More precisely, the concavity of the rotation hook 7 is oriented towards the body 1 of the cap A, and the concavity of the locking hook 8 is oriented towards the distal end of the tab 2 of the cap A. Installation and locking of such a cap A with a wiper arms as described previously and shown in the figures is performed in the same manner as that described above, that is to say successively by engaging the engagement bar 53 of the wiper arm with the rotation hook 7 of the cap, then rotating the cap about the axis represented by this engagement bar until the upper surface 20 of the tab 2 of the cap A is parallel to the upper surface 30 of the body 3 of the wiper arm B, and, finally, by forward translation, that is to say towards the distal end of the tab 2 of the cap A, until the engagement bar 53 of the wiper arm B is inserted into the locking hook 8 of the cap A.

The first embodiment described above makes it possible to provide visual continuity for the driving arm. This makes it possible to design the wiper arm such that it has no discontinuities, as shown in particular in FIG. 5. Therefore, the wiper arm does not have increased mechanical fragility, or breakage starting points placed in a zone of the wiper arm in which the torque applied by the driving motor is high. This phenomenon is even more pronounced since the wiper blade, attached to the opposite end of the driving arm, has to remove, from the glazed surface, elements having a certain weight, such as in particular snow that has accumulated on the glazed surface.

FIG. 12 shows the end of the second portion 2 of the cap A, according to a second embodiment. The description below presents the differences with respect to the first embodiment, and for the elements in common reference will be made to the above description.

An attachment means 89 comprises the rotation zone 222, the latter being designed so as to allow the cap to rotate with respect to the wiper arm of the second embodiment. This attachment means also comprises the locking zone 223 for locking said cap onto this driving arm.

In this case, the entrance 61 is bounded by a chamfer 80, and allows access to the rotation zone 222. Compare to the first embodiment, the entrance lug 227 has a triangular cross section, in particular essentially identical to the spur 228. This rotation zone is delimited by a first semicircular wall 81 and by a second semicircular wall 82 opposite the first semicircular wall 81.

The nib 228 forms a transition between the rotation zone 222 and the locking zone 223. According to this second embodiment, this locking zone 223 comprises a longitudinal rib 83 that extends along the longitudinal axis capital X of the second portion 2 of the cap A. According to this exemplary embodiment, this longitudinal rib 83 divides the locking zone 223 into two. The longitudinal rib 83 begins on the blade 221 and extends in the direction of the lower face 21 of the second portion 2. This longitudinal rib thus extends into the space forming the locking zone 223. According to this exemplary embodiment, the longitudinal rib 83 is straight between the connecting wall 220 and the nib 228. As in the first embodiment, the rotation zone 222 cooperates with an engagement bar so as to guide a rotation of the cap about this bar while the locking zone 223 causes the cap to translate with respect to the arm up to a position where it is retained in its final position.

The second cap portion 2 of the second embodiment of the invention is designed to cooperate with a wiper arm shown in FIG. 13. The description below presents the differences with respect to the wiper arm of the first embodiment, and for the elements in common reference will be made to the above description.

The clear area 54 is bounded by side walls 540 which have the particular feature of continuing onto the side walls 40 of the arch 4, as far as the lower edge 31 which delimits a sharp edge of the wiper arm B.

The wall 60 delimits the accommodating opening 6 and the bottom 542 of the clear area 54 begins at this wall 60 bounding the accommodating opening 6. As for the first embodiment of the invention, the bottom 542 contains a whole for creating a pocket 51 for receiving the rotation zone of the cap and a locking pocket 52 that engages with the locking zone of the cap. These two pockets are separated from one another by the engagement bar 53. FIG. 13 shows that the bottom 542 of the clear area 54 extend beyond the receiving pocket 51 in the direction of the body 3 of the wiper arm B. Thus, the receiving pocket 51 is delimited by a segment 84 which is distinct from the wall 541 that delimits the clear area 54.

According to this second embodiment, the wiper arm B comprises at least one guide 85 whose purpose is to guide the translation of the extension 22 beneath the bottom 542 during procedure of locking the cap to the driving arm. Such a guide 85 consists for example of at least one leg 86 that begins at an internal wall of the wiper arm B. In this case, the guide 85 comprises two legs 85 and 87 that extend towards the arch 4 from the body 3 of the arm.

The configuration of the two legs 86 and 97, between which a space is created, makes it possible for the rotation zone of the cap to be accommodated on the thickness of the bottom 542 located between the segment 84 of the receiving pocket 512 and the wall 541 that delimits the clear area 54.

FIG. 14 shows the same part of the wiper arm as that illustrated in FIG. 13, but seen from below. The body 3 of the wiper arm B thus comprises the internal wall which here has the reference 90 and from which projects the guide 85, in particular the legs 86 and 87.

The engagement bar 53 comprises a notch 531, the bottom which is in the forth of the flat 530. The angular position of this flat 530 is different to its position in the first embodiment. Indeed, the notch 531 is arranged such that the flat 530 which constitutes the bottom of the notch forms an angle of between 85 and 95 degrees with the vertical direction as defined previously. According to this second non-exclusive embodiment of the invention, more particularly illustrated in FIGS. 12 to 17, this angle is equal to 90 degrees. While in the first embodiment this flat 530 cooperates with the rotation zone 222 of the cap, it is provided in this case that this flat 530 engages with the locking zone 223 of the cap according to the second embodiment.

In the first embodiment, the flat 530 defines the angle at which the cap must be fitted onto the engagement bar 53. In the second embodiment, the angular position of the flat 530 permits translation of the cap by cooperation between the longitudinal rib of the extension and the notch 531.

FIGS. 15 to 17 illustrate the steps of installing and locking the cap A on the wiper arm B. These four figures also show a driving element 92 whose purpose is to mechanically connect the wiper arm B to the motorized shaft while allowing an articulation between the driving element 92 and the wiper arm B. The motorized shaft is shown schematically by means of an axis line with the reference W. The articulation between the wiper arm B and the driving element 92 is controlled by a spring 88, shown here in part. This spring 88 also generates the force pressing the wiper blade against the glazed surface.

FIG. 15 shows the cap A being introduced onto the wiper arm B, and in particular the attachment means 89 being introduced onto the engagement bar 53. This first step is performed by translation of the cap A, as shown by the arrow F1. After this translation, the engagement bar 53 is received in the rotation zone 222, the locking zone remaining empty. Flexibility of the blade 221 allows the entrance lug 227 two move away from the lower face 21, thus allowing access to the rotation zone 222.

FIG. 16 illustrates the second step of the process for fitting the cap A onto the wiper arm B. This second step consists of a rotation, shown by the arrow having reference F2 and effected by sliding between the rotation zone 222 and the engagement bar 53. After this rotation, the longitudinal axis X of the cap A is aligned with the longitudinal axis X1 of the wiper arm B. The cap A is then ready to be locked on the wiper arm B since the longitudinal rib 83 is aligned with the notch 531 created in the engagement bar 53.

FIG. 16 shows another particular aspect of the invention. Indeed, a rear edge 220a on the edge of the connecting wall 220 is in abutment against the rear wall 521 of the locking pocket 52. Such an arrangement forms a stop when it is necessary to unlock the cap A, thus imposing a rotational movement to raise the cap A and act on the motorized shaft W.

FIG. 17 shows the third step of the process for fitting the cap A onto the wiper arms. This third step consists in locking the cap A onto the wiper arm B by causing the cap A to translate according to the arrow having reference F3. In the course of this translation, the longitudinal rib 83 enters into the notch 531 and a free face of this rib comes into contact with the flat 530. The longitudinal rib 83 is then guided by the notch 531. It is also noted that the longitudinal rib 83 helps to lock the cap A since it opposes any rotation of the cap A when the rib is received in the notch 531. In such a position, the entrance lug 227 comes to press against the internal wall 90 of the wiper arm B. According to the example shown here, the lower face 21 and the entrance lug 227 hold either side of the bottom 542 that is located between the segment 84 of the receiving pocket 512 and the wall 541 that delimits the clear area 54.

At the same time as this final translational movement, the one or more immobilizing lugs 14 arranged in the lower part of the inner face of the side wall of the body 1 of the cap A advantageously fit underneath the lower edge of the rear wall of the arch or, more generally, depending on the embodiment chosen, underneath a lower edge of the wiper arm B, thus establishing a means for immobilizing the cap A with this driving arm, at least in the vertical direction.

The cap A is thus locked to the wiper arm B at least:
by the engagement of the bar 53 of the wiper arm in the locking zone 223 of the cap A, and/or
by the cooperation of the side walls of the tab 2 of the cap A with the side walls 540 of the clear area 54 arranged in the wiper arm B, and/or
by the cooperation of the immobilizing lug 14 arranged in the cap A with a lower edge 412 or 31 of the wiper arm B.

Uncoupling the cap A and the wiper arm B involves merely reversing the order of the above-described assembly steps.

The invention described above is not limited to the means and configurations described and illustrated, and it also applies to any equivalent means or configurations, and to any combination of such means.

The invention claimed is:

1. A wiping system of a vehicle extending along a longitudinal axis, comprising:
a cap configured to cover an arch of a wiper arm;
the wiper arm comprising:
a front end that is able to receive a wiper blade;
a rear end that is able to be connected to a motorized shaft via an intermediary of a drive;
a body located between the front and rear ends;
at the rear end, an arch in which is arranged an opening for receiving the motorized shift; and
between the arch and the body, at least one receiving pocket and at least one locking pocket that are able to engage with the cap that covers the arch,
wherein the at least one receiving pocket and the at least one locking pocket are longitudinally offset along the longitudinal axis of the wiper arm.

2. The wiping system according to claim 1, in which the at least locking pocket is placed, along the longitudinal axis in which extends the wiper arm, between the at least receiving pocket and the accommodating opening.

3. The wiping system according to claim 1, in which a transverse dimension of the at least receiving pocket is greater than a transverse dimension of the at least locking pocket.

4. The wiping system according to claim 1, in which the at least receiving pocket and the at least locking pocket are separated from one another by an engagement bar.

5. The wiping system according to claim 4, in which the engagement bar is at least partially cylindrical and comprises a flat.

6. The wiping system according to claim 1, having a clear area delimited at least by two side walls and set back from an upper surface of the body of the wiper arm, at least one of said side walls being level with said upper surface.

7. The wiping system according to claim 6, in which a transverse dimension of the at least locking pocket is less than a transverse dimension separating the two side walls, as measured along one and the same straight line.

8. The cap configured to cover the arch of the wiper arm for the wiping system of the vehicle according to claim 1 and configured to engage with the at least one receiving pocket and the at least one locking pocket of said wiper arm, said cap comprising:
   a first portion that is able to cover the front end of the wiper arm; and
   a second portion comprising an attachment means for attaching the cap to the wiper arm,
   wherein the attachment means comprises at least one rotation zone that is arranged to allow the cap to rotate with respect to the wiper arm, and the at least one locking zone for locking said cap to said wiper arm.

9. The cap according to claim 8, in which the second portion is in the form of a tab which extends longitudinally away from a cavity delimited by the first portion.

10. The cap according to claim 8, in which the rotation zone is separated from the locking zone by at least one nib that is in the form of a spur.

11. The cap according to claim 8, in which the rotation zone and the locking zone are delimited by at least one extension which extends from a lower face of the second portion.

12. The cap according to claim 11, in which the rotation zone and the locking zone are in the form of hollows created in a blade of the extension.

13. The cap according to claim 8, in which the rotation zone is created between the locking zone and a distal end of the second portion, as seen in a longitudinal axis of the cap.

14. The cap according to claim 8, in which the rotation zone comprises an entrance bounded at least in part by an entrance lug.

15. The cap according to claim 14, in which the entrance is bounded by a distal end of the second portion.

16. The cap according to claim 8, in which the locking zone comprises a longitudinal rib.

17. The cap according to claim 8, in which the first portion delimits a cavity that is open at its lower end and closed at its upper end by a wall, an upper face of the second portion extending in a plane that is essentially parallel to a plane in which extends the wall.

18. The cap according to claim 17, in which the first portion comprises at least one side wall which delimits at least the cavity and which extends from the lower end of the cavity to the wall, and in which a cutout is arranged in the side wall of this cavity.

19. An assembly comprising:
   a wiper arm for a wiping system of a vehicle; and
   a cap configured to cover an arch of the wiper arm and configured to engage with at least one receiving pocket and at least one locking pocket of said wiper arm,
   wherein the wiper arm comprises:
      a front end that is able to receive a wiper blade;
      a rear end that is able to be connected to a motorized shaft via an intermediary of a drive;
      a body located between the front and rear ends;
      at the rear end, an arch in which is arranged an opening for receiving the motorized shaft; and
      between the arch and the body, the at least one receiving pocket and the at least one locking pocket that are able to engage with the cap that covers the arch, and
   wherein the cap comprises:
      a first portion that is able to cover the front end of the wiper arm; and
      a second portion comprising an attachment means for attaching the cap to the wiper arm, and
   wherein the attachment means comprises at least one rotation zone that is arranged to allow the cap to rotate with respect to the wiper arm, and a locking zone for locking said cap to said wiper arm.

20. The assembly according to claim 19, in which the rotation zone extends in the at least receiving pocket, while the locking zone extends in the at least one locking pocket, an engagement bar of the wiper arm being received in the locking zone.

21. The assembly according to claim 20, in which a longitudinal rib of the cap, which forms part of the locking zone, extends in a notch created in the engagement bar.

\* \* \* \* \*